May 22, 1956      J. M. WUNDERLEY      2,746,919
APPARATUS FOR TREATING ACID WASTE PICKLE LIQUOR
Filed July 7, 1952      4 Sheets-Sheet 1
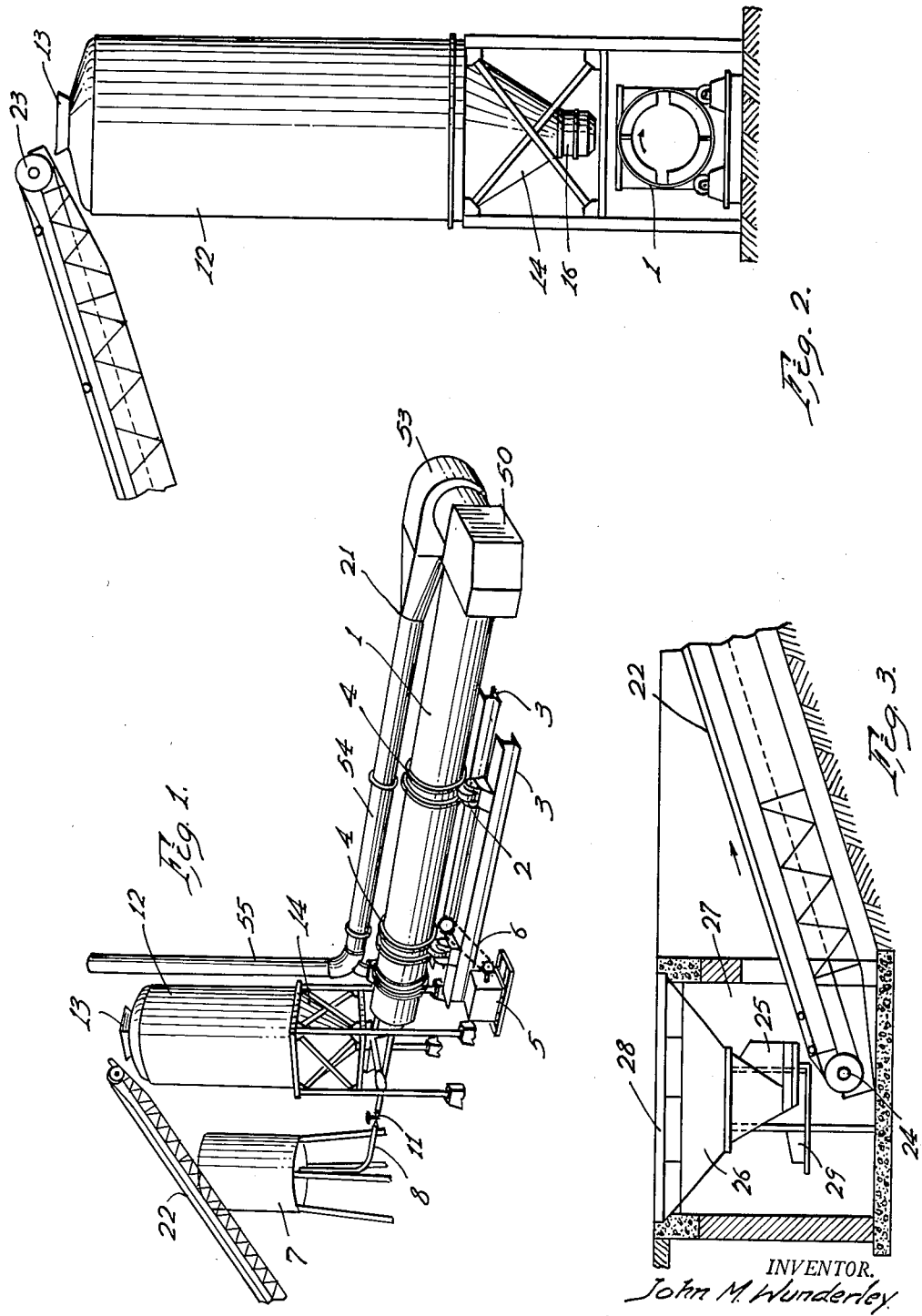
INVENTOR.
John M. Wunderley
BY
Christy Parmelee & Strickland
ATTORNEYS

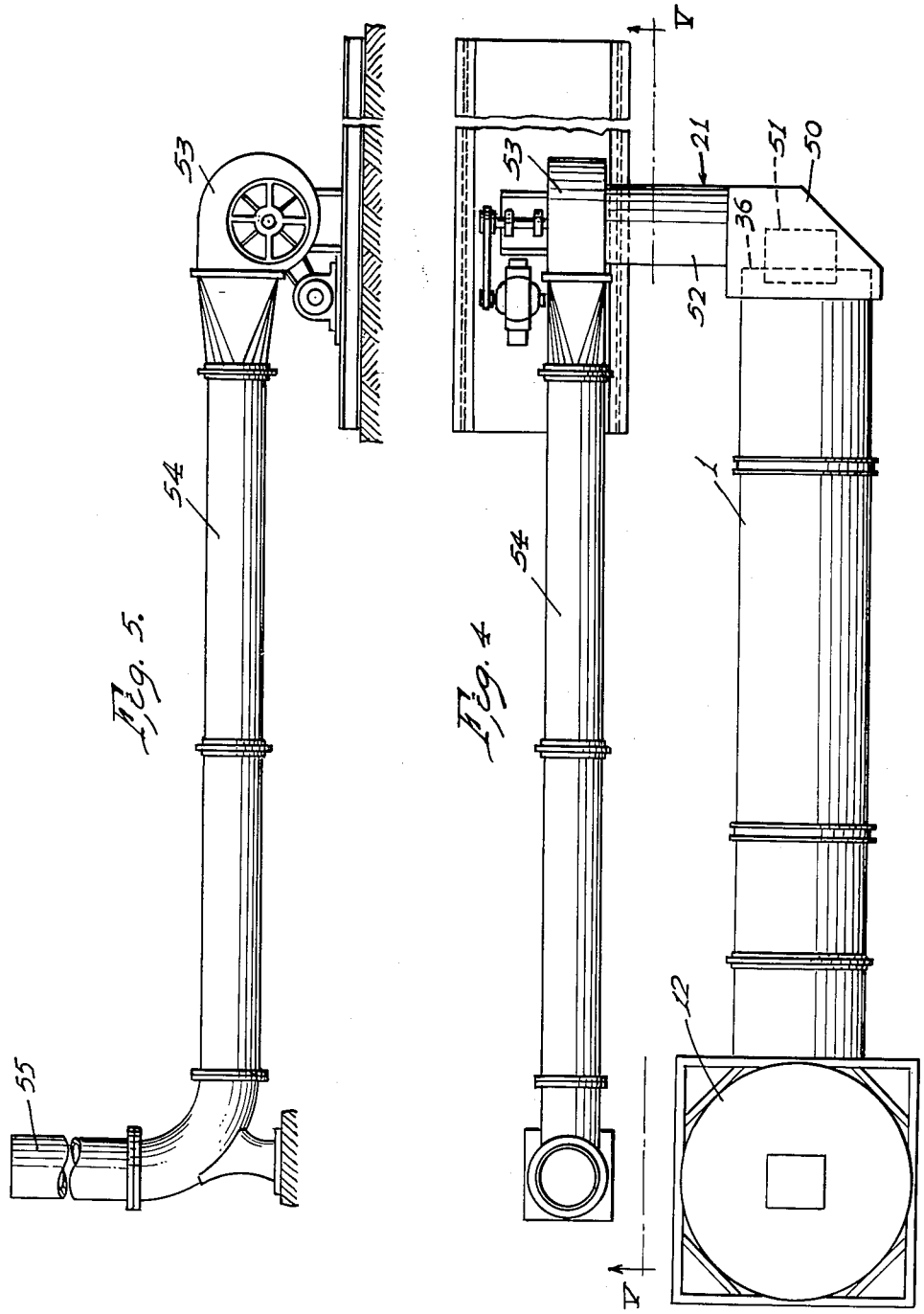

May 22, 1956 J. M. WUNDERLEY 2,746,919
APPARATUS FOR TREATING ACID WASTE PICKLE LIQUOR
Filed July 7, 1952 4 Sheets-Sheet 3
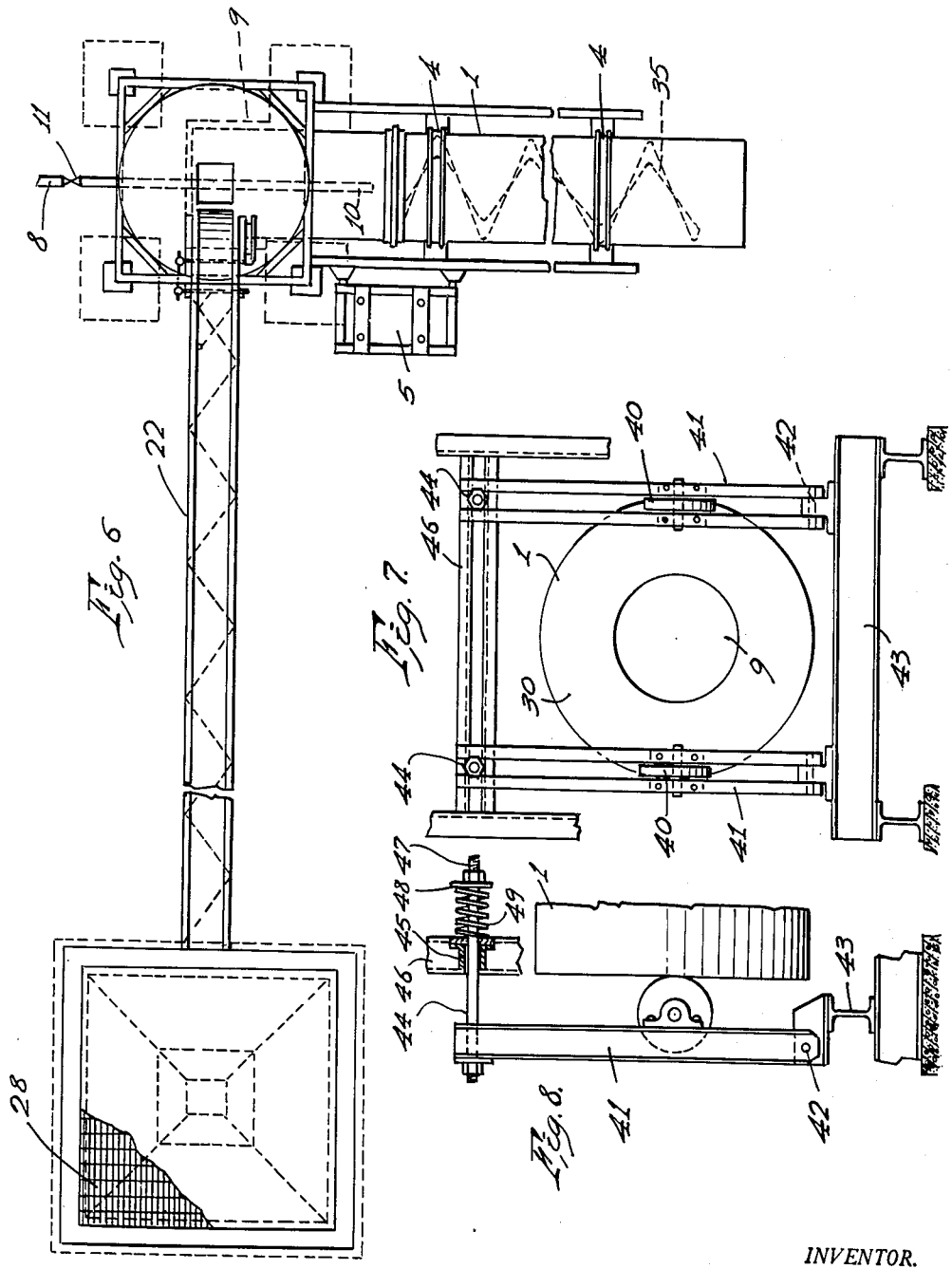
INVENTOR.
John M. Wunderley.
BY
Christy Parmelee & Strickland
ATTORNEYS:-

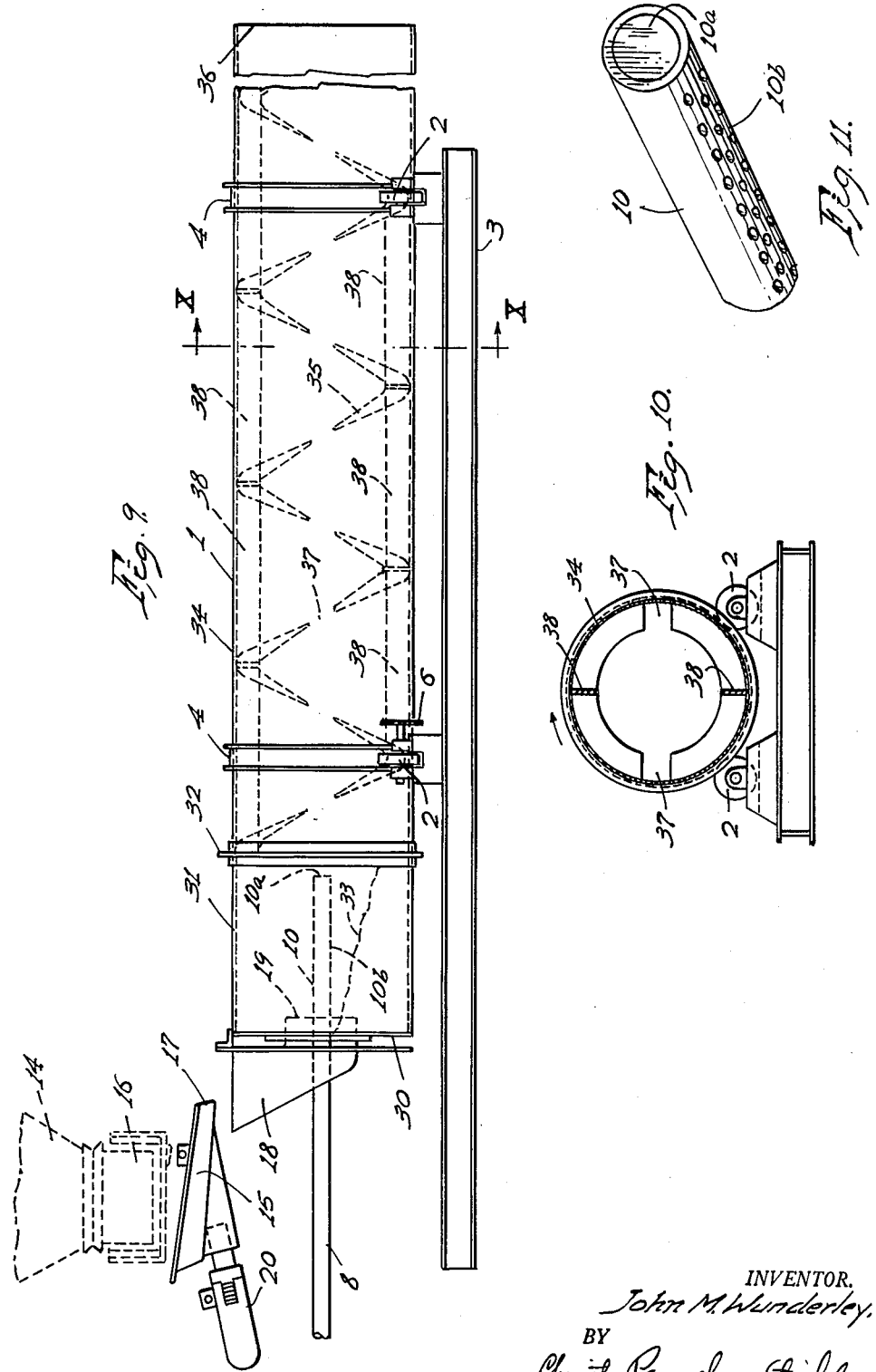

United States Patent Office 2,746,919
Patented May 22, 1956

2,746,919

APPARATUS FOR TREATING ACID WASTE PICKLE LIQUOR

John M. Wunderley, Liberty, Pa.

Application July 7, 1952, Serial No. 297,579

5 Claims. (Cl. 210—2)

This invention relates, as indicated, to an apparatus for treating acid waste pickle liquor, and, more particularly, to an apparatus for neutralizing and disposing of waste pickle liquor by mixing it with granulated blast furnace slag in a manner such that the liquid is absorbed by the slag.

More specifically, the apparatus of this invention is one which is particularly adapted to carrying out the process of neutralizing acid waste pickle liquor described in my copending application Serial No. 165,880, filed June 2, 1950, now abandoned. The acid waste pickle liquor is that which results from the metallurgical operation of pickling ferrous metal articles in a dilute solution of sulphuric acid. The process described in the said copending application comprises absorbing the waste pickle liquor in a quantity of granulated blast furnace slag of the type produced by introducing molten basic blast furnace slag into water. Generally stated, an amount of slag is used which is sufficient to completely absorb the acid containing liquid. While the use of greater proportions of slag to liquid results in a greater neutralizing effect, satisfactory results are obtained by the use of slag sufficient only to absorb the liquid, there being produced in such case a mixture in the nature of a slurry or mud which will flow by gravity, although somewhat sluggishly, but from which the liquid will not drain. As explained in the said application, the purifying operation of the process is improved by agitation of the mixture of acid and slag. In the practice of the process, agitation of the mixture results in the absorption of a greater quantity of liquor by a given amount of slag and in a greater fixation of the iron content of the liquid. By "fixation of iron content" is meant the property of the process by which the ferrous sulphate or other forms of iron is reduced to an insoluble form and retained in the mixture permanently, leaching of the mixture with water after air drying producing no noticeable or undesirable quantities of iron in the run-off water.

One of the principal objects of this invention is to provide an apparatus for treating waste pickle liquor by absorbing it in and mixing it with granulated blast furnace slag in a continuous manner. To this end, there is provided a rotating cylinder in which the absorbing and mixing operation of the slag and acid is effected. The interior surface of the cylinder is provided with a novel arrangement of agitating elements, of a character to be described, for effecting maximum agitation of the materials being mixed while moving such materials axially through the cylinder to its discharge end at a desired rate of speed. The slag and acid are introduced continuously at one end, the charging end, of the cylinder while its other end is utilized as a discharge end.

Other objects and advantages of the invention will become apparent from the following description.

In the drawings, there is shown a preferred embodiment of the invention. In this showing:

Fig. 1 is a perspective view of a typical installation of apparatus constructed in accordance with the principles of this invention;

Fig. 2 is a front elevational view looking from the front of the mixing cylinder with the ventilating housing therefor removed;

Fig. 3 is a fragmentary diagrammatic and sectional view of the lower end of a conveyor system for delivering granulated slag to the mixing apparatus, the upper end of which is shown in Fig. 2;

Fig. 4 is a plan view showing the general arrangement of the ventilating apparatus with respect to the mixing cylinder;

Fig. 5 is a sectional and elevational view looking in the direction of the line V—V of Fig. 4;

Fig. 6 is a plan view of a mixing cylinder and a conveyor for supplying granulated slag thereto;

Fig. 7 is a detail end elevational view of an apparatus for absorbing the axial thrust created by the cylinder in response to its mixing operation;

Fig. 8 is a fragmentary elevational view partly in vertical section looking from the right of Fig. 7;

Fig. 9 is an enlarged elevational view of the rotary mixing cylinder, parts of the apparatus illustrated being broken away and other parts being shown diagrammatically;

Fig. 10 is a sectional view taken substantially along the line X—X of Fig. 9; and Fig. 11 is an enlarged fragmentary perspective view of an end of the spray pipe shown in Fig. 9.

The overall arrangement of the apparatus is best shown in Fig. 1. In this showing, the numeral 1 designates a mixing cylinder which is mounted for rotation about its longitudinal axis by supporting rollers 2 mounted on base supports 3, the rollers 2 having a guided rolling engagement in trackways 4 which encircle the cylinder. Rotation of the cylinder is effected through a suitable drive motor, diagrammatically designated at 5, which operates a chain and sprocket drive 6 for one of the supporting rollers 2, the frictional engagement of the guide roller 2 in its trackway 4 being thereby effective to impart rotation to the cylinder 1.

The acid to be neutralized is stored in a tank 7 from which it flows by gravity through a conduit 8 to the mixing cylinder. As best shown in Figs. 7 and 9, the inner end of the cylinder has a charging opening 9 through which the delivery end 10 of the conduit 8 projects. A valve 11 is provided for adjustably controlling the rate of flow of acid into the cylinder and for shutting off such flow when desired.

The granulated slag used in the neutralization of the acid or waste pickle liquor is stored in a cylindrical bin 12 having a charging opening 13 at its top and a discharging hopper 14 at its bottom. As best shown in Fig. 9, the bottom of the discharge hopper 14 is positioned directly above an inclined chute 15. The chute 15 is suspended by cables (not shown) from the supporting structure for the container 12, and is normally effective to prevent movement of the material out of the bottom 16 of the hopper 14. The slag gravitating out of the bottom 16 falls on the inclined surface of the chute 15 and builds up thereon until it blocks further flow of material through the hopper bottom 16. The front end 17 of the chute 15 is positioned above a charging hopper 18 which has its lower end 19 projecting through the opening 9 into the interior of the cylinder 1. Flow of granulated slag into the hopper 18 is controlled by an electrical vibrating unit designated schematically at 20. Vibration of the inclined chute 15 by the vibrator 20 will cause the material deposited on the inclined surface of the chute 15 to move to the right as viewed in Fig. 9 and gravitate into the charging hopper 18 at a rate which is dependent upon the frequency of vibration of the chute 15 by its vibrating unit 20. While an electrical vibrator unit 20 is preferred, any suitable form of vibrating unit may be used.

The interior of the cylinder 1 is ventilated by an apparatus designated as a whole by the numeral 21 in a manner to be referred to.

The manner in which granulated slag is delivered to the storage container 12 will be best understood by referring to the showing of Figs. 2, 3 and 6. In this showing, the numeral 22 designates a belt conveyor unit which has its upper end 23 positioned over the charging opening 13 in the upper end of the storage container 12. The lower end 24 of the conveyor 22, as shown in Fig. 3, is positioned under a charging spout 25 connected to the lower end of a hopper 26 in a pit 27. The upper end of the pit 27 and hopper 26 is closed by a grating 28 on which granulated slag may be dumped from a truck or other conveyor. An electrical or mechanical vibrator designated diagrammatically at 29 is provided for effecting movement of the slag out of the hopper 26 and onto the upwardly moving flight of the belt 22. The slag deposited on the belt of the conveyor 22 will gravitate into the opening 13 when it falls from the upper end 23 of such conveyor.

As best shown in Fig. 7 the charging end of the cylinder 1 has an annular end plate 30 in which the charging opening 9 is formed, the acid conduit 10 and the lower end 19 of the charging hopper 18 projecting through the opening 9 as described above. Referring to Fig. 9, an initial mixing chamber 31 is provided just forwardly of the end plate 30. The chamber 31 extends from the end plate 30 to the connecting ring 32 and comprises a relatively small proportion of the entire length of the cylinder 1. In the chamber 31, the dry slag and waste acid pickle liquor contact each other for the first time and the initial mixing action by which the liquor is absorbed in the slag takes place in this chamber. The granulated slag delivered to the mixing cylinder through the hopper opening 19 builds up on the floor of the chamber 31 as designated diagrammatically by the dotted line 33. The mass of slag under the surface 33 will be continuously changing since rotary movement of the cylinder will tend to carry the slag upwardly along the inner surface of the chamber 31 at one side thereof. The acid delivery conduit 8 has its end 10 extending into the chamber 31 to a point adjacent the connecting ring 32. As shown in Fig. 11, the end 10a of the acid delivery conduit is closed and the lower surface of 10b of the pipe 10 is provided with a plurality of spray openings along its entire length. By reason of the spray openings along the surface 10b, the acid is sprayed onto the surface 33 of the slag. The delivery of the acid in the form of a spray combined with the tumbling action of the slag in the chamber 31 effects an initial distribution of the liquor in the slag. In addition, the acid flowing onto the surface 33 exerts a washing action on such slag which moves the mixture to the right as viewed in Fig. 9 for a further mixing action in the final mixing chamber 34. The washing action of the acid on the slag combined with the tumbling motion imparted thereto by the cylinder effects an initial mixing of the slag and liquor in the chamber 31, the mixing being completed in the chamber 34 in a manner to be described.

As the slag gradually builds up within the chamber 31, the action of the acid spray moves the slag and entrained liquor forward beyond the end 32 of the chamber 31 into a final mixing chamber 34. The chamber 34 is provided with a spiral mixing vane 35 which extends spirally along the inner surface of the cylinder 1 and is effective to move the slag and acid mixture to the right, as viewed in Fig. 9, to its discharge end 36. Movement of the slag and acid mixture through the cylinder by the spiral vane 35 is, of course, at a more rapid rate than is effected by the washing action of the acid sprayed into the chamber 31. Consequently, the level of the slag in the bottom of chamber 34 will be considerably lower than the level of the mixture in the chamber 31. It will thus be apparent that the mixing action in the chamber 34 effects a more intimate admixture of the slag and liquor than is obtained in the chamber 31. In order that the spiral vane 35 will not move the mixture axially of the cylinder 1 at an excessive rate of speed, the vane 35 is interrupted at spaced intervals as at 37. The interruptions 37 serve to slow down the movement of the mixture to the discharge opening 36. To increase the mixing action, a plurality of straight vanes or baffle plates 38 are mounted interiorly of the cylinder. The vanes 38 are flat metal plates which are welded in position extending axially between adjacent sections of the spiral vane 35 and lying in a radial plane of the cylinder. They increase the mixing action of the mixture in that they carry the mixture up the side of the cylinder before it is dropped to the bottom again.

Rotation of the cylinder 1 with a load of slag and acid therein creates a considerable axial thrust by reason of the action of the mixing vane 35 in moving the material to the right as viewed in Fig. 9, this end thrust on the cylinder 1 being to the left as viewed in this figure. The magnitude of the thrust will be better appreciated when it is considered that a typical installation employs a cylinder having a length of approximately thirty feet and a diameter of about four feet. The proportion of slag and liquor, as explained in the above mentioned application, will be dependent somewhat on the amount of water contained in the slag as it comes from the granulating pits, and may vary from somewhat less than ten pounds of granulated slag to a gallon of liquor to as much as seventeen pounds per gallon. A proportion employing about equal parts by weight of slag and liquor will be found satisfactory in that it produces a wet mixture in the nature of a slurry which will flow by gravity and in which the acid content is neutralized and the iron content fixed against removal. In a cylinder of the above mentioned dimensions being rotated at about 20–25 R. P. M., the feeding of slag at the rate of about 80 tons per hour and pickle liquor at the rate of about 50 tons per hour will be found highly satisfactory. The thrust due to this mixture of slag and acid reaches relatively large proportions since in operation there will frequently be several thousand pounds of the mixture within the cylinder 1. In order to absorb the end thrust of mixing action on the cylinder 1, the apparatus shown in Figs. 7 and 8 has been provided. This apparatus comprises a pair of rollers 40 which have rolling engagement with the surface of the annular end plate 30. The rollers 40 are journalled in vertical supporting members 41 which have pivot connections 42 at their bottoms to a stationary support 43. The upper ends of the uprights 41 are connected to rods 44 which project through openings 45 provided in a stationary supporting cross bar 46. The inner ends 47 of the rods 44 are provided with a collar 48. A spring 49 is positioned between the collars 48 and the cross support 46 for resiliently resisting pivotal movement of the supports 41 in a counterclockwise direction as viewed in Fig. 8. The end thrust on the cylinder 1, being to the left as viewed in Fig. 8, is applied to the rollers 40 and is resiliently absorbed by the springs 49 through the upright supports 41.

The mixing of the slag and acid liquor generates steam and fumes within the cylinder 1, and to remove these gases, the ventilating apparatus 21, previously referred to above, is provided. As best shown in Figs. 4 and 5, the ventilating apparatus 21 comprises a sheet metal housing 50 into which the discharge end 36 of the cylinder 1 projects. The housing 50 is provided with an opening 51 in its bottom through which the mixed acid and slag may gravitate to an inclined discharge chute (not shown). The interior of the housing 50 is connected by an exhaust conduit 52 to a motor-driven fan 53 which forces the exhaust gases through a conduit 54 to an exhaust stack 55 from the upper end of which they are exhausted to the atmosphere.

Exhaust of the steam and fumes from the interior of the cylinder 1 causes fresh air to be drawn into the cylinder 1 through the opening 9 in its charging end. While the retention of the steam and fumes within the cylinder 1 will not harm the apparatus or operating personnel, its removal enables treatment of a greater quantity of liquor by a given quantity of slag. Mixing of the slag and liquor produces heat which vaporizes some of the water content of the liquor. By removing the steam generated in this manner through ventilation of the interior of the cylinder, part of the water content of the liquor is removed, and it is thus not necessary for the slag to absorb so much liquid. It is thus possible to use a lesser amount of slag than would otherwise be required.

It is believed that the operation of the apparatus will be apparent from the foregoing and that it will be sufficient to point out that the apparatus is placed in operation by first operating the motor 5 to rotate the cylinder 1 and the fan 53 to circulate air therethrough. Thereafter, the vibrator 20 may be operated to deliver slag through the hopper 18 to the interior of the tank. A quantity of slag sufficient to provide a good covering for the base of the container 31 is first introduced since this prevents direct contact of the acid with the interior surface of the cylinder and thus protects the cylinder from the corrosive effects of the acid. Thereafter, the valve 11 is opened to introduce waste acid pickle liquor through the conduit 10, the opening of the valve 11 and the operation of the vibrator 20 being adjusted so that slag and acid are introduced into the rotating cylinder 1 in the desired proportions. Contrary to expectation, experimental use of an apparatus constructed as described herein has shown that the acid has little, if any, corrosive action on the metal surfaces interiorly of the cylinder. Such surfaces in the normal use of the apparatus became encrusted or covered with a coating of either slag particles or products of the chemical reaction which provides a protective covering on which the acid has no noticeable effect. While it is necessary to employ a tank 7 and conduit 8 having a special acid resisting rubber lining, the interior metal surfaces in the cylinder need not be specially fabricated for resisting acid corrosion.

The washing action of the liquor being sprayed onto the surface 33 of the slag in the chamber 31, and the action of the spiral mixing vanes 35, results in the axial movement of the slag and liquor to the discharge end 36 in an intimately mixed relation. This mixture will gravitate out of the discharge opening, and due to its wet and muddy condition, may be flowed away through an inclined discharge chute (not shown). The acid content of the pickle liquor in this mixture will be found to be satisfactorily neutralized, and after drying, the residue may be used as a fill in much the same manner as granulated slag is now employed. Moreover, the air-dried residue may have water run through it, and the water flowing away will not show any noticeable acid content and will not contain any noticeable amount of iron.

While the apparatus described above and shown in the drawings represents a preferred embodiment of the invention, it will be understood that this is merely by way of illustration, and that various changes and modifications may be made therein within the contemplation of this invention and under the scope of the following claims.

I claim:

1. An apparatus for treating waste pickle liquor comprising an elongated horizontal cylinder mounted for rotation about its longitudinal axis and having a charging opening at one end thereof and a discharge opening at the other end thereof, a hopper for introducing slag into said cylinder through said charging opening, a conduit extending through said opening for delivering a supply of liquor to be treated onto the surface of said slag, a spiral agitating vane comprising a coiled strip of several convolutions extending spirally of the interior surface of said cylinder between the inner end of the conduit and discharge end of the cylinder for mixing the slag and liquor introduced therein and for moving the mixture to said discharge end, and a plurality of straight vanes respectively extending axially of said cylinder between adjacent convolutions of said spiral vane for increasing the mixing action on said slag and liquor and for slowing down its movement to said discharge opening.

2. An apparatus for treating waste pickle liquor comprising an elongated cylinder mounted for rotation about its longitudinal axis, means for introducing waste pickle liquor and granulated slag into one end of said cylinder, means for rotating said cylinder, a spiral mixing vane comprising a coiled strip of several convolutions extending axially of and secured to the inner surface of said cylinder for mixing the slag and liquor therein and for moving the mixture in a direction toward the other end of the cylinder, and a plurality of straight vanes mounted on the inner surface of said cylinder and respectively extending axially thereof and between adjacent convolutions of said spiral vane.

3. An apparatus for treating waste pickle liquor comprising an elongated cylinder mounted for rotation about its longitudinal axis, means for introducing waste pickle liquor and granulated slag into one end of said cylinder, means for rotating said cylinder, agitating vanes on the interior surface of said cylinder for mixing the slag and liquor therein and for moving the mixture to and discharging it from the other end of the cylinder, a stationary support on which said cylinder is mounted, a roller having rolling engagement with the said one end of said cylinder, a mounting member carrying said roller and connected with said support for movement relative thereto, and a spring resiliently biasing said member against movement relative to said support and thereby effective to absorb the end thrust of said cylinder in response to axial movement of the mixture therein by said agitating vanes.

4. An apparatus as claimed in claim 3 characterized by said mounting member having a pivotal connection to said support for pivotal movement relative thereto.

5. Apparatus for treating waste pickle liquor comprising an elongated horizontal cylinder mounted for rotation about its longitudinal axis and having a charging opening at one end thereof and a discharging opening at the other end thereof, a hopper for introducing slag into the cylinder adjacent said charging opening having smooth inner walls for tumbling of the slag upon rotation of the cylinder without materially advancing the slag through the cylinder, a conduit extending through the cylinder charging opening and disposed above the slag in the smooth walled portion of the cylinder, apertures in the under side of the conduit for spraying pickle liquor upon the slag beneath the conduit for mixing therewith and washing the accumulating slag forwardly of the cylinder, mixing vanes angularly disposed to the longitudinal center line of the cylinder and spaced longitudinally and circumferentially of the cylinder from adjacent the pickle liquor spraying conduit to the discharge opening of the cylinder for mixing and intermittently advancing the slag and liquor through the cylinder upon rotation thereof and at least two diametrically spaced longitudinally extending vanes imparting purely rotary motion to the advancing slag and liquor passing through the cylinder.

References Cited in the file of this patent

UNITED STATES PATENTS

| | | |
|---|---|---|
| 1,741,019 | Harrington | Dec. 24, 1929 |
| 1,848,095 | Bartlett | Mar. 8, 1932 |
| 2,059,435 | Brownlee | Nov. 3, 1936 |
| 2,228,185 | Thompson | Jan. 7, 1941 |
| 2,507,291 | Wright et al. | May 9, 1950 |
| 2,623,737 | McEachran | Dec. 30, 1952 |
| 2,623,820 | Messing | Dec. 30, 1952 |